(12) United States Patent
Endo

(10) Patent No.: US 7,200,945 B2
(45) Date of Patent: Apr. 10, 2007

(54) SURVEYING INSTRUMENT

(75) Inventor: Masamitsu Endo, Kanagawa (JP)

(73) Assignee: Sokkia Co., Ltd., Kanagawa (JP)

( * ) Notice: Subject to any disclaimer, the term of this patent is extended or adjusted under 35 U.S.C. 154(b) by 0 days.

(21) Appl. No.: 11/098,597

(22) Filed: Apr. 5, 2005

(65) Prior Publication Data

US 2006/0021236 A1 Feb. 2, 2006

(30) Foreign Application Priority Data

Jul. 30, 2004 (JP) ............................. 2004-223783

(51) Int. Cl.
*G01C 15/00* (2006.01)
(52) U.S. Cl. ..................................... 33/290
(58) Field of Classification Search ................. 33/290
See application file for complete search history.

(56) References Cited

U.S. PATENT DOCUMENTS

| | | | | |
|---|---|---|---|---|
| 6,044,567 | A * | 4/2000 | Feist | 33/290 |
| 6,411,372 | B1 * | 6/2002 | Donath et al. | 356/4.08 |
| 6,453,569 | B1 * | 9/2002 | Kumagai et al. | 33/290 |
| 7,040,030 | B2 * | 5/2006 | Sawaguchi | 33/290 |

FOREIGN PATENT DOCUMENTS

| | | |
|---|---|---|
| JP | 2000-028362 | 1/2000 |
| JP | 2003-232634 | 8/2003 |

* cited by examiner

*Primary Examiner*—Christopher W. Fulton
(74) *Attorney, Agent, or Firm*—Roberts, Mlotkowski & Hobbes; Thomas W. Cole

(57) ABSTRACT

To obtain an accurate survey value even if a centering operation is simplified without using a specific target. When a survey point S is displayed on the screen of a display 20 as an image picked up by a CCD camera 38 in a process to perform an operation for placing a surveying instrument 10 directly above the survey point S, a centering operation is ended, and the survey point S is specified as a true centering point. Accordingly, coordinates (Xs, Ys) of the survey point S in which the instrument center point 0 is defined as an origin are calculated as a decentering amount (i.e., dislocation) of the survey point S with respect to an instrument center point 0. At this time, a horizontal angle $\theta'h$ determined when a target T is collimated on the basis of the instrument center is obtained by performing angle measurement, and a horizontal-angle correction amount $\Delta\theta h$ is calculated on the basis of the coordinates (Xk, Yk) of the virtual centering point K and on the basis of the coordinates (Xs, Ys) of the survey point S. The horizontal angle $\theta'h$ is corrected by this horizontal-angle correction amount $\Delta\theta h$, and the horizontal angle $\theta h$ based on the survey point S is obtained.

4 Claims, 9 Drawing Sheets

(Horizontal plane)

(Vertical plane)

SURVEYING INSTRUMENT

TECHNICAL FIELD

The present invention relates to a surveying instrument, and more particularly to a surveying instrument structured to perform at least either distance measurement or angle measurement.

BACKGROUND ART

A survey instrument using a survey, such as a total station or a digital theodolite, is conventionally performed as follows. A surveying instrument is first placed in the vicinity of a survey point (reference point) so that the main body of the surveying instrument can be located substantially_directly_ above_the_survey_point_before_surveying. After that, a leveling operation by which the surveying instrument is set to be horizontal is performed by using a circular bubble tube or a lateral bubble tube, and then a centering operation to adjust a centering point is performed so that the instrument center of the surveying instrument can be located directly above the survey point while observing the survey point by use of a optical plummet or a laser plummet device. In order to perform this centering operation, the surveying instrument is required to be fairly accurately set to become horizontal during the leveling operation. However, the instrument center of the surveying instrument is caused to coincide with the survey point after the surveying instrument is set horizontally, and therefore, if the instrument center of the surveying instrument is moved, a case will occur in which the leveling of the surveying instrument becomes wrong in response to this movement, so that the leveling operation and the centering operation are repeatedly performed. Moreover, an operator is obliged to observe the survey point while peering through the optical plummet whenever the centering operation is performed.

Therefore, a surveying instrument has been proposed in which a centering operation to cause the instrument center of the surveying instrument to coincide with a survey point is simplified, and, even if a deviation exists between the instrument center thereof and the survey point, a measured value is corrected in accordance with this deviation (see Patent Document 1).

In more detail, as shown in FIG. 10 to FIG. 12, an instrument height measuring target 2100 is installed on a target 2000 used as a survey point, and the target 2100 is picked up by a first CCD 1160 and a second CCD 1170 through a reflecting prism 1300, an objective lens 1140, a first beam splitter 1130, and a second beam splitter 1150. Thereafter, a dislocation (i.e., decentering amount) x in the X direction from the reference point as an image formed by allowing the first CCD 1160 to pick up is superposedly displayed on the instrument height measuring target image formed on a reticle 1120 and on an image of the reference point indicating the center of the instrument height measuring target image, and a dislocation (i.e., decentering amount) y in the Y direction from the reference point as an image formed by allowing the second CCD 1170 to pick up is superposedly displayed thereon. The dislocations x and y are then calculated on the basis of a distance between a predetermined 0 point of the X- or Y-axis and the position of a middle point of only a cross point having an interval differing from those of cross points that cross the X- or Y-axis of each circular image among concentric circles of the instrument height measuring target image. Measured values obtained by distance measurement and by angle measurement are then corrected by the dislocations x and y of a plumb position, thus making it possible to perform an accurate survey only by performing a rough positional adjustment as a centering operation.

Japanese Published Unexamined Patent Application No. 2000-28362 (pages 4 to 6, FIG. 1 to FIG. 3.

DISCLOSURE OF THE INVENTION

Problems to be Solved by the Invention

The conventional instrument employs a structure in which measured values obtained by distance measurement and by angle measurement are corrected based on dislocations x and y of a plumb position, and therefore an accurate survey result can be obtained even if the centering operation is simplified. However, the specific target 2100 must be installed on the survey point in order to calculate the dislocations x and y of the plumb position, and hence, if the centering operation is simplified by use of other targets, the possibility that an accurate survey cannot be performed will arise.

The present invention has been made in consideration of the aforementioned problems of the conventional instrument, and it is an object of the present invention to obtain an accurate survey value without using a specific target even if a centering operation is simplified.

Means for Solving the Problems

In order to achieve the object, a surveying instrument according to claim 1 comprises a measurement means for performing at least either distance measurement or angle measurement; an image pickup means for picking up an area located under a vertical shaft of an instrument body, the area existing as a photographic subject; a display means for displaying an image picked up by the image pickup means on a screen; a decentering-amount calculation means for calculating an amount of decentering of a survey point with respect to an instrument center of the instrument body in response to specification by which the survey point displayed on the screen in the form of the image picked up by the image pickup means is fixed as a true centering point; and a correction means for correcting a measured value of the measurement means based on the instrument center on the basis of a calculation result obtained by the decentering-amount calculation means.

(Action) In order to install the surveying instrument in the vicinity of a survey point, a centering operation is ended under the condition that the survey point has been displayed on the screen of the display means as an image picked up by the image pickup means, and, when the survey point displayed on the screen of the display means is specified as a true centering point, the decentering amount (i.e., dislocation) of the survey point with respect to the instrument center of the instrument body is calculated in response to this specification. For example, an instrument-center point corresponding to the instrument center of the instrument body is assumed to be the origin of a two-dimensional coordinate system in which a set of machine coordinates (X-Y coordinates) of the surveying instrument is shown or in which the screen of the display means is shown. Based on this origin, the coordinates (Xs, Ys) of the survey point are calculated as a decentering amount that shows a dislocation of a centering point (i.e., a dislocation caused by simplifying a centering operation). At this time, a measured value is calculated on the basis of the instrument center of the surveying instrument by performing distance measurement or angle measurement. An accurate measured value can be obtained by correcting the resultant measured value by the decentering amount indicating a dislocation of the centering point. In other words, the centering operation is ended under the condition that the survey point has been displayed on the screen of the display means, and a measured value is corrected on the basis of a deviation caused by simplifying the centering operation only by specifying the survey point displayed on the screen of the display means as a true centering point without installing a specific target at the survey point even if the centering operation is simplified. Therefore, an accurate measured value can be obtained, thereby making it possible to contribute to the improvement of workability.

A surveying instrument according to claim 2 comprises a measurement means for performing at least either distance measurement or angle measurement; an image pickup means for picking up an area located under a vertical shaft of an instrument body, the area existing as a photographic subject; a display means for displaying an image picked up by the image pickup means on a screen; a decentering-amount calculation means for calculating an amount of decentering of a survey point with respect to an instrument center of the instrument body in response to specification by which the survey point displayed on the screen in the form of the image picked up by the image pickup means is fixed as a true centering point; an auxiliary decentering-amount calculation means for calculating an amount of decentering from the instrument center of an axial center of the vertical shaft, the decentering caused by a slant of the vertical shaft of the instrument body; and a correction means for correcting a measured value of the measurement means based on the instrument center on the basis of a calculation result obtained by the decentering-amount calculation means and on the basis of a calculation result obtained by the auxiliary decentering-amount calculation means.

(Action) In order to install the surveying instrument in the vicinity of a survey point, a centering operation and a leveling operation are ended under the condition that the survey point has been displayed on the screen of the display means as an image picked up by the image pickup means, and, when the survey point displayed on the screen of the display means is specified as a true centering point, the decentering amount (i.e., dislocation) of the survey point with respect to the instrument center of the instrument body and the decentering amount from the instrument center of the axial center of the vertical shaft caused by a slant of the vertical shaft of the instrument body are calculated in response to this specification. For example, an instrument-center point corresponding to the instrument center of the instrument body is assumed to be the origin of a two-dimensional coordinate system in which a set of machine coordinates (X-Y coordinates) of the surveying instrument is shown or in which the screen of the display means is shown. Based on this origin, the coordinates (Xs, Ys) of the survey point are calculated as a decentering amount that shows a dislocation of a centering point (i.e., a dislocation caused by simplifying a centering operation). Further, based on this origin, coordinates (Xk, Yk) of a virtual centering point, which show the amount of decentering from the instrument center of the axial center of the vertical shaft caused by a slant of the vertical shaft of the instrument body (i.e., a deviation caused by simplifying the leveling operation), are calculated. At this time, a measured value is calculated on the basis of the instrument center of the surveying instrument by performing distance measurement or angle measurement. An accurate measured value can be obtained by correcting the resultant measured value on the basis of the coordinates (Xs, Ys) of the survey point and the coordinates (Xk, Yk) of the virtual centering point. In other words, the leveling operation and the centering operation are ended under the condition that the survey point has been displayed on the screen of the display means, and a measured value is corrected on the basis of a deviation caused by simplifying the centering operation and leveling operation only by specifying the survey point displayed on the screen of the display means as a true centering point without installing a specific target at the survey point even if the leveling operation and the centering operation are simplified. Therefore, an accurate measured value can be obtained, thereby making it possible to contribute to the improvement of workability.

A measured-value correction apparatus of a surveying instrument according to claim 3 comprises an image pickup means for picking up an area located under a vertical shaft of an instrument body, the area existing as a photographic subject; a display means for displaying an image picked up by the image pickup means on a screen; a decentering-amount calculation means for calculating an amount of decentering of a survey point with respect to an instrument center of the instrument body in response to specification by which the survey point displayed on the screen in the form of the image picked up by the image pickup means is fixed as a true centering point; and a correction means for correcting a measured value based on the instrument center on the basis of a calculation result obtained by the decentering-amount calculation means.

(Action) When the survey point displayed on the screen of the display means is specified as a true centering point, the decentering amount of the survey point with respect to the instrument center of the instrument body is calculated in response to this specification. For example, an instrument-center point corresponding to the instrument center of the instrument body is assumed to be the origin of a two-dimensional coordinate system in which the screen of the display means is shown. Based on this origin, the coordinates (Xs, Ys) of the survey point are calculated as a decentering amount that shows a dislocation of a centering point (i.e., a dislocation caused by simplifying a centering operation). Thereafter, an accurate measured value can be obtained by correcting a measured value obtained by performing distance measurement or angle measurement on the basis of the instrument center of the surveying instrument by use of the decentering amount indicating a dislocation of the centering point. In other words, a measured value is corrected on the basis of a deviation caused by simplifying the centering operation only by specifying the survey point displayed on the screen of the display means as a true centering point without installing a specific target at the survey point even if the measured value is obtained by distance measurement or angle measurement in a state in which the centering operation is simplified. Therefore, an accurate measured value can be obtained, thereby making it possible to contribute to the improvement of workability.

A measured-value correction apparatus of a surveying instrument according to Claim 4 comprises an image pickup means for picking up an area located under a vertical shaft of an instrument body, the area existing as a photographic subject; a display means for displaying an image picked up by the image pickup means on a screen; a decentering-amount calculation means for calculating an amount of decentering of a survey point with respect to an instrument center of the instrument body in response to specification by which the survey point displayed on the screen in the form of the image picked up by the image pickup means is fixed as a true centering point; an auxiliary decentering-amount calculation means for calculating an amount of decentering from the instrument center of an axial center of the vertical shaft, the decentering caused by a slant of the vertical shaft of the instrument body; and a correction means for correcting a measured value based on the instrument center on the basis of a calculation result obtained by the decentering-amount calculation means and on the basis of a calculation result obtained by the auxiliary decentering-amount calculation means.

(Action) When the survey point displayed on the screen of the display means is specified as a true centering point, the decentering amount of the survey point with respect to the instrument center of the instrument body is calculated in response to this specification. For example, an instrument-center point corresponding to the instrument center of the instrument body is assumed to be the origin of a two-dimensional coordinate system in which the screen of the display means is shown. Based on this origin, the coordinates (Xs, Ys) of the survey point are calculated as a decentering amount that shows a dislocation of a centering point (i.e., a dislocation caused by simplifying the centering operation). Further, based on this origin, coordinates (Xk, Yk) of a virtual centering point, which show the amount of decentering from the instrument center of the axial center of the vertical shaft caused by a slant of the vertical shaft of the instrument body (i.e., a deviation caused by simplifying the leveling operation), are calculated. Thereafter, a measured value is calculated on the basis of the instrument center of the surveying instrument by performing distance measurement or angle measurement. An accurate measured value can be obtained by correcting the resultant measured value on the basis of the coordinates (Xs, Ys) of the survey point and the coordinates (Xk, Yk) of the virtual centering point. In other words, a measured value is corrected on the basis of a deviation caused by simplifying the leveling operation and centering operation only by specifying the survey point displayed on the screen of the display means as a true centering point without installing a specific target at the survey point even if the measured value is obtained by distance measurement or angle measurement in a state in which the leveling operation and centering operation are simplified. Therefore, an accurate measured value can be obtained, thereby making it possible to contribute to the improvement of workability.

EFFECTS OF THE INVENTION

As is apparent from the foregoing description, according to the surveying instrument of claim 1, an accurate measured value can be obtained, and a contribution can be achieved to the improvement of workability even if a centering operation is simplified without installing a specific target at a survey point.

According to claim 2, an accurate measured value can be obtained, and a contribution can be achieved to the improvement of workability even if a centering operation and a leveling operation are simplified without installing a specific target at a survey point.

According to the measured-value correction apparatus of the surveying instrument of claim 3, an accurate measured value can be obtained, and a contribution can be achieved to the improvement of workability even if a measured value is obtained by distance measurement or angle measurement in a state in which a centering operation is simplified without installing a specific target at a survey point.

According to claim 4, an accurate measured value can be obtained, and a contribution can be achieved to the improvement of workability even if a measured value is obtained by distance measurement or angle measurement in a state in which a leveling operation and a centering operation are simplified without installing a specific target at a survey point.

BEST MODE FOR CARRYING OUT THE INVENTION

The mode of the present invention will now be described in accordance with embodiments. FIG. 1 is a perspective view of a surveying instrument showing an embodiment of the present invention, FIG. 2 is a sectional view of a main part of the surveying instrument, FIG. 3 is a view showing a display example of a display, FIG. 4 is a block diagram of the surveying instrument, and FIG. 5 is a flowchart for explaining the operation of the surveying instrument.

In these drawings, the surveying instrument 10 is structured as, for example, a total station including a measured-value correction apparatus, and has a body casing 12 serving as an instrument body. The body casing 12 is provided with two supporting pillars 14, between which a horizontal shaft (not shown) is rotatably supported. A collimation telescope 16 is fixed to the horizontal shaft at a right angle with respect to the axial direction of the horizontal shaft. This collimation telescope 16 is vertically rotatable in a state of being supported by the horizontal shaft. An optical rotary encoder (V encoder 40) used as a vertical-angle sensor that detects the rotational amount of the horizontal shaft is contained in the body casing 12.

A display unit 18 is disposed on the lower part of the body casing 12. The display unit 18 is made up of a display 20 and a set of operation keys 22. The display 20 is a display means for displaying data concerning distance measurement and angle measurement on a screen when the distance measurement and the angle measurement are performed, and for displaying an image picked up by an image pickup means or the like on the screen, as described later, when a leveling operation and a centering operation are performed. The set of operation keys 22 is adjacent to the display 20, and is structured as an input means for inputting information such as a necessary predetermined condition or instrument height.

The body casing 12 is disposed on a leveling plate 25. The leveling plate 25 can be fixed to a tripod (not shown) in a state of being placed on the tripod. A shaft tube 26 extending in upward and downward directions is disposed on a fixed portion 24. The shaft tube 26, through an inner part of which the vertical shaft 28 of the body casing 12 is passed, is rotatably supported by the fixed portion 24 with ball bearings placed therebetween. Accordingly, the body casing 12 is unified with the fixed portion 24, and can be rotated horizontally with respect to the fixed portion 24. The leveling plate 25 has three leveling screws by which the vertical shaft 28 of the surveying instrument 10 is vertically adjusted, and the fixed portion 24 is fixed thereonto.

Flange portions 30 and 32 facing each other are formed on the upper end of the shaft tube 26 and on the upper end of the vertical shaft 28, respectively. An annular main scale 34 and an annular sub-scale 36 are fastened to the flange portions 30 and 32, respectively. The scales 34 and 36 are disposed to face each other with a slight gap therebetween, and the sub-scale 36 is rotated with respect to the main scale 34 in response to the rotation of the vertical shaft 28. That is, one of the scales is fixed to the shaft tube 26, and the other is fixed to the vertical shaft 28. A light-emitting element and a light-receiving element (both not shown) are disposed to face each other with the scales 34 and 36 therebetween. The light-emitting element, the light-receiving element, the main scale 34, and the sub-scale 36 constitute an optical rotary encoder (H encoder 42) that is a horizontal-angle sensor used to detect the rotational amount of the body casing 12.

The vertical shaft 28 mounted on the body casing 12 is shaped as a hollow cylinder. A CCD (Charge Coupled Device) camera 38 is disposed on the side of the upper end of the vertical shaft 28. The CCD camera 38 is fixed to the body casing 12 vertically downward so that its optical axis coincides with the axial line (axial center) L of the vertical shaft 28. That is, a crisscross (i.e., reticle line intersection) of the CCD camera 38 is structured as an image pickup means for picking up an area, which is a photographic subject and which is located under the vertical shaft of the body casing 12, through the hollow part of the vertical shaft 28. The CCD camera 38 is connected to a display unit 18 through a wire placed in the body casing 12. An image of places existing directly under the surveying instrument 10, which is an image picked up by the CCD camera 38, is displayed on the screen of the display 20.

For example, as shown in FIG. 3, a X-axis reticle line and a Y-axis reticle line are displayed on the screen of the display 20 by forming the screen as a two-dimensional coordinates system. An instrument center point 0, which is the intersection of the X-axis and Y-axis reticle lines and which corresponds to the instrument center of the surveying instrument 10 (i.e., instrument center of the body casing 12), is displayed as a reference point on the screen, and a virtual centering point K is displayed on the screen. When the surveying instrument 10 is installed in the vicinity of the survey point S, and the survey point S is picked up by the CCD camera 38, the survey point S is displayed on any part of the screen of the display 20 in accordance with the position of the survey point S.

As shown in FIG. 4, the surveying instrument 10 is provided with a V encoder 40 and an H encoder 42 for performing angle measurement and an electro-optical distance meter 44 for performing distance measurement while detecting a target to be measured, each of which serves as a measurement means for performing distance/angle measurement. The surveying instrument 10 is provided with an X-axis tilt sensor 46 for detecting a tilt angle in the X-axis direction of the body casing 12 (i.e., an X-axis direction of a set of X-Y coordinates) and a Y-axis tilt sensor 48 for detecting a tilt angle in the Y-axis direction of the body casing 12 (i.e., in the Y-axis direction of the set of X-Y coordinates). The V encoder 40, the H encoder 42, the electro-optical distance meter 44, and the tilt sensors 46, 48 are connected to a microcomputer (hereinafter, referred to as "CPU") 50. The CPU 50 arithmetically processes data transmitted from the CCD camera 38, from the V encoder 40, from the H encoder 42, from the electro-optical distance meter 44, and from the tilt sensors 46, 48, and a result obtained by this arithmetic processing is displayed on the screen of the display 20. In this case, the CPU 50 performs various calculations according to a system of two-dimensional coordinates in which, for example, machine coordinates of the surveying instrument 10 (i.e., X-Y coordinates in which the direction of the X-axis coincides with that of the collimation axis of the telescope 16 and in which the direction of the Y-axis coincides with that of the horizontal shaft) are shown, or in which the screen of the display 20 is shown (in which XY coordinate axes of the screen are caused to coincide with those of the machine coordinate system)

Next, operations needed when a survey is performed with the surveying instrument 10 will be described with reference to the flowchart of FIG. 5.

First, the surveying instrument 10 is disposed in the vicinity of a survey point S so that the body casing 12 can be placed above the survey point S, and then rough alignment and a horizontal adjustment are performed so that the survey point S can be displayed on the screen of the display 20 as an image picked up by the CCD camera 38 (step S1). That is, in order to simplify a leveling operation and a centering operation, rough alignment and a horizontal adjustment are performed. At this time, an instrument center point 0 and a virtual centering point K are displayed on the screen of the display 20, for example, as shown in FIG. 3, and the survey point S is also displayed thereon. Since the vertical shaft 28 is inclined in this case, the virtual centering point K (therefore, when K=0, this coincides with the instrument center because there is no slant) is displayed at a position deviating from the instrument center point 0, and the survey point S is displayed at a position deviating from the instrument center point 0 because the survey point S does not exist directly under the instrument center. When the survey point S is displayed at a position deviating from the instrument center point 0 and from the virtual centering point K, an indicator, such as a cursor (reticle line) appearing at the virtual centering point K is moved to the survey point S, and the survey point S is specified as a true centering point and is recognized (step S2). At this time, the CPU 50 responds to the operation that specifies the survey point S as a true centering point, and calculates coordinates (Xs, Ys) of the survey point S as a decentering amount (i.e., a dislocation) of the survey point S with respect to the instrument center 0.

Thereafter, an instrument height H, which is a distance between the axial center of the horizontal shaft or the optical axis of the telescope 16 and the survey point S, is measured (step S3). This instrument height H can be obtained by measuring a two-point target in a collimated manner although this can be obtained by use of a tape measure. When the instrument height H is calculated with the tape measure, data concerning the instrument height H is input from the set of operation keys 22.

Thereafter, distance measurement and angle measurement are performed on the basis of the instrument center of the surveying instrument 10 (step S4). In this case, as shown in FIG. 6 (in which distance/angle measurement is developed in a horizontal plane) and in FIG. 7 (in which distance/angle measurement is developed in a vertical plane), a horizontal distance l'h and a slant distance l's from the instrument center point 0 to the center of the target T can be obtained by collimating a target T with the telescope 16 and by measuring its distance with an electro-optical distance meter. Further, a horizontal angle θ'h is obtained by measuring its angle with the H encoder 42 as shown in FIG. 6, and a vertical angle θ'v is obtained by measuring its angle with the V encoder 40 as shown in FIG. 7.

However, these measured values are values obtained when distance measurement and angle measurement are performed on the basis of the instrument center of the surveying instrument 10, not on the basis of the survey point S. Therefore, in order to obtain measured values on the basis of the survey point S without performing a centering operation by which the virtual centering point K or the survey point S is caused to coincide with the instrument center point 0, measured values obtained by distance/angle measurement based on the instrument center of the surveying instrument 10 are corrected on the basis of coordinates (Xs, Ys) of the survey point S and coordinates (Xk, Yk) of the virtual centering point K (step S5).

In this case, on the basis of a detection output θx of the X-axis tilt sensor 46, a detection output θy of the Y-axis tilt sensor 48, and an instrument height H, the coordinates (Xk, Yk) of the virtual centering point K are obtained as an amount of decentering from the instrument center of the axial center of the vertical shaft which is caused by a slant of the vertical shaft 28 by allowing the CPU 50 to perform an arithmetical operation. These can be expressed as in the following equations.

$$X_k = -H \tan \theta_x \quad \text{[Formula 1]}$$

$$Y_k = -H \tan \theta_y$$

Thereafter, in order to obtain a horizontal angle θh on the assumption that the target T is collimated on the basis of the survey point S, a correction amount Δθh of the horizontal angle is calculated. This horizontal-angle correction amount Δθh can be expressed as in the following equation.

$$\Delta\theta h = \theta h - \theta' h \quad \text{[Formula 2]}$$
$$= -\tan^{-1}\frac{Y_k + Y_s}{1'h - (X_k + X_s)}$$
$$= -\tan^{-1}\frac{Y_S - H \tan \theta_Y}{1'h + H \tan \theta_x + X_s}$$

Therefore, the horizontal angle θh based on the survey point S can be expressed as in the following equation.

$$\theta h = \theta' h + \Delta\theta h \quad \text{[Formula 3]}$$
$$= \theta' h - \tan^{-1}\frac{\beta}{\alpha}$$

However, $$\beta = Y_s - H \tan \theta_Y$$

$$\alpha = l'h + H \tan \theta_X + X_s$$

On the other hand, the horizontal distance lh (i.e., distance between the survey point S and the center of the target T) obtained on the assumption that the target T is collimated on the basis of the survey point S can be expressed as in the following equation.

$$1H = \sqrt{\{1'h - (X_k + X_S)\}^2 + (Y_k + Y_s)^2} \quad \text{[Formula 4]}$$
$$= \sqrt{\alpha^2 + \beta^2}$$

The slant distance ls (i.e., distance between the survey point S and the center of target T) obtained on the assumption that the target T is collimated on the basis of the survey point S can be expressed as in the following equation.

$$1_S = \frac{1h}{\sin\theta_v} \quad \text{[Formula 5]}$$

There is a relationship between the horizontal distance lh and the horizontal distance l'h as expressed by the following equation.

$$\frac{1h}{\tan\theta_v} = \frac{1'h}{\tan\theta'_v} \quad \text{[Formula 6]}$$

Therefore, the vertical angle θv obtained on the assumption that the target T is collimated on the basis of the survey point S can be expressed as in the following equation.

$$\theta_V = \tan^{-1}\left(\frac{1h}{1'h}\tan\theta'_v\right) \quad \text{[Formula 7]}$$

The horizontal distance lh, the slant distance ls, the vertical angle θv, and the horizontal angle θh can be obtained as measured values based on the survey point S by performing an arithmetic operation to correct the measured values obtained by the distance measurement and the angle measurement based on the instrument center of the surveying instrument 10 on the basis of the coordinates (Xs, Ys) of the survey point S and the coordinates (Xk, Yk) of the virtual centering point K in accordance with the arithmetic expressions shown in Formula 1 to Formula 7.

In this case, the CPU 50 serves as a decentering-amount calculation means for calculating a decentering amount of the survey point S with respect to the instrument center of the instrument body in response to specification by which the survey point S displayed on the screen of the display 20 is fixed as a true centering point, and serves as an auxiliary decentering-amount calculation means for calculating a decentering amount from the instrument center of the axial center of the vertical shaft which is caused by a slant of the vertical shaft 28 of the instrument body, and serves as a correction means for correcting the measured values based on the instrument center on the basis of a calculation result of the decentering-amount calculation means and on the basis of a calculation result of the auxiliary decentering-amount calculation means.

If measured values based on the survey point S are obtained, these values are displayed on the screen of the display 20 (step S6). Thereafter, a determination as to whether all steps have been ended or not is made by the CPU 50 (step S7). If other steps still remain as steps for correcting the measured values, the stage proceeds to step S5, and, if all steps have been ended, the process in this routine is ended. Thereafter, when a survey at the same point (survey point) is continued, the process returns to the distance measurement and the angle measurement of step 4, where a measuring operation, a correcting operation, and a display operation are repeatedly performed. When all surveying operations are ended, the stage proceeds to step 7, where the process in this routine is ended.

According to this embodiment, the leveling operation and the centering operation are ended under the condition that the survey point S has been displayed on the screen of the display 20, and measured values (i.e., measured values by distance/angle measurement based on the instrument center of the surveying instrument 10) are corrected on the basis of a deviation caused by simplifying the centering operation and leveling operation only by specifying the survey point S displayed on the screen of the display 20 as a true centering point without installing a specific target at the survey point S even if the leveling operation and the centering operation are simplified. Therefore, an accurate measured value can be obtained as a measured value based on the survey point S, thereby making it possible to contribute to the improvement of workability.

In the aforementioned embodiment, a description was given of the process for correcting measured values obtained by distance/angle measurement based on the instrument center of the surveying instrument 10 on the basis of coordinates (Xs, Ys) of the survey point S and coordinates (Xk, Yk) of the virtual centering point K. However, if no consideration is given to a deviation caused by simplifying the leveling operation, an accurate measured value can be obtained as a measured value based on the survey point S even if measured values obtained by distance/angle measurement based on the instrument center of the surveying instrument 10 are corrected on the basis of the coordinates (Xs, Ys) of the survey point S. In this case, the horizontal distance lh, the slant distance ls, the vertical angle $\theta v$, and the horizontal angle $\theta h$ can be obtained as measured values based on the survey point S by setting each of the detection output $\theta x$ of the X-axis tilt sensor 46 and the detection output $\theta y$ of the Y-axis tilt sensor 48 at 0 (zero) to disregard the horizontal-angle correction amount $\Delta\theta h$ and by performing an arithmetic operation according to the arithmetic expressions shown in Formula 3 to Formula 7.

According to this embodiment, the centering operation is ended under the condition that the survey point S has been displayed on the screen of the display 20, and measured values (i.e., measured values by distance/angle measurement based on the instrument center of the surveying instrument 10) are corrected on the basis of a deviation caused by simplifying the centering operation only by specifying the survey point S displayed on the screen of the display 20 as a true centering point without installing a specific target at the survey point S even if the centering operation is simplified. Therefore, an accurate measured value can be obtained as a measured value based on the survey point S, thereby making it possible to contribute to the improvement of workability.

DESCRIPTION OF SYMBOLS

Figure 1:
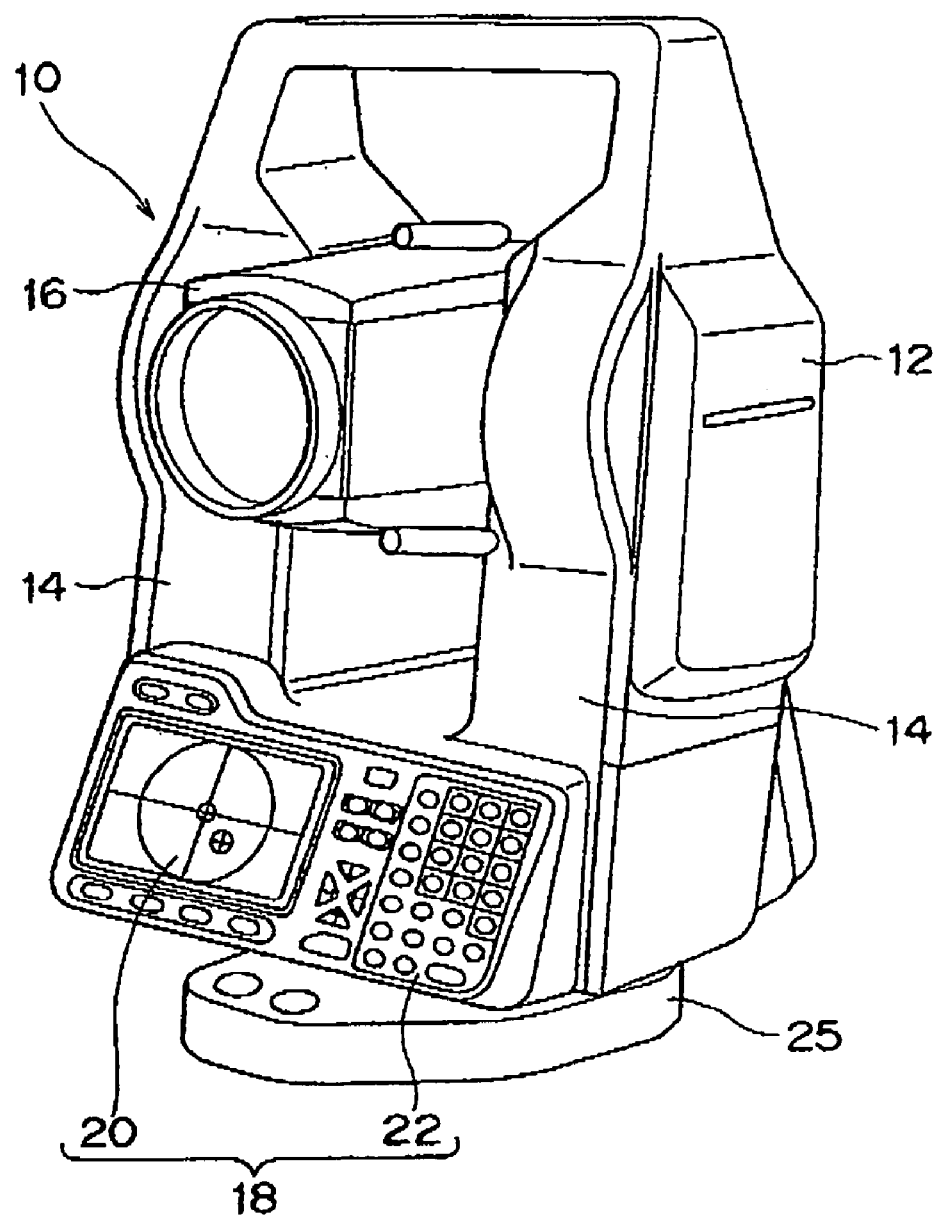
FIG. 1 is a perspective view of a surveying instrument showing an embodiment of the present invention.
Figure 2:
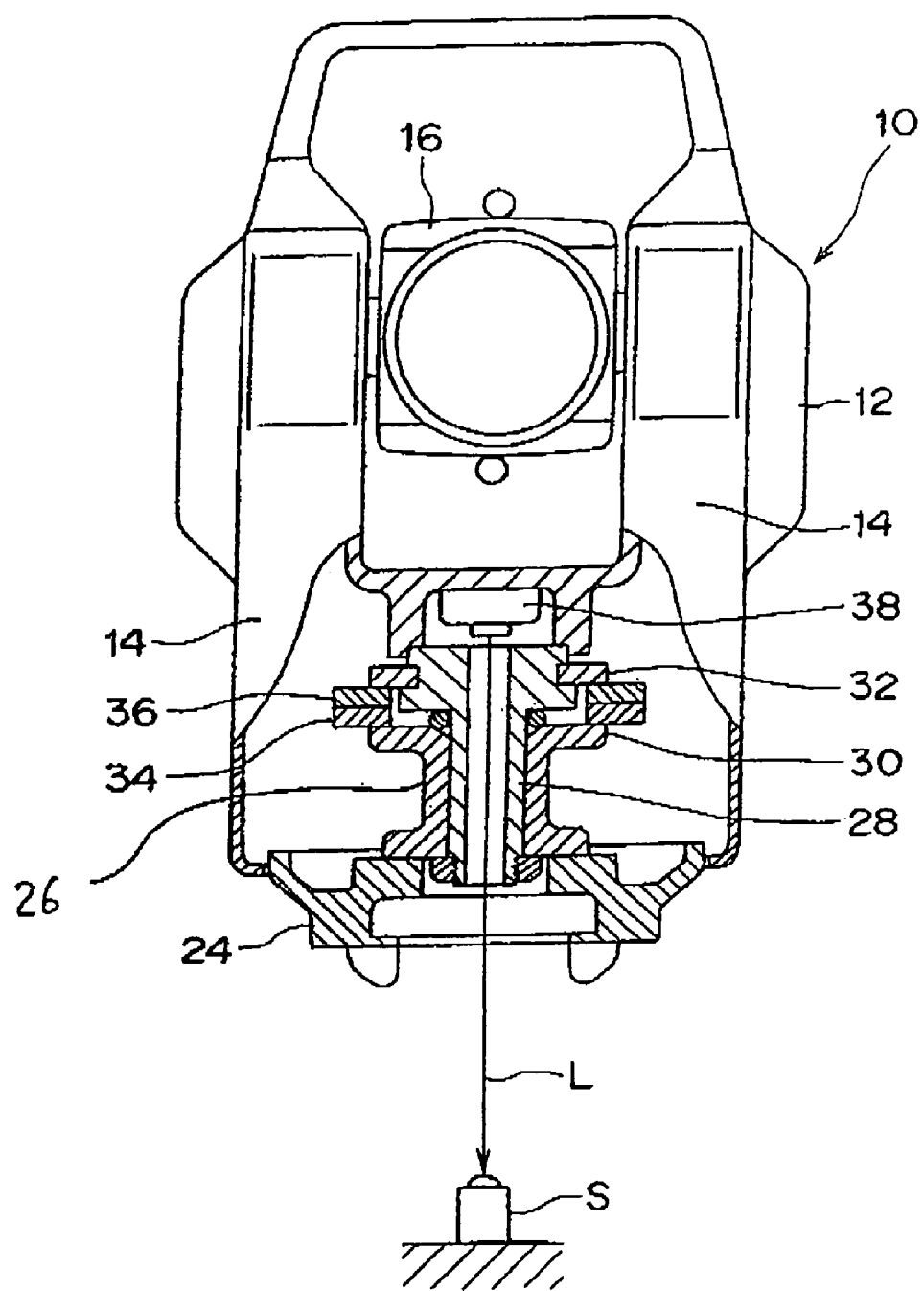
FIG. 2 is a sectional view of the main part of the surveying instrument.
Figure 3:
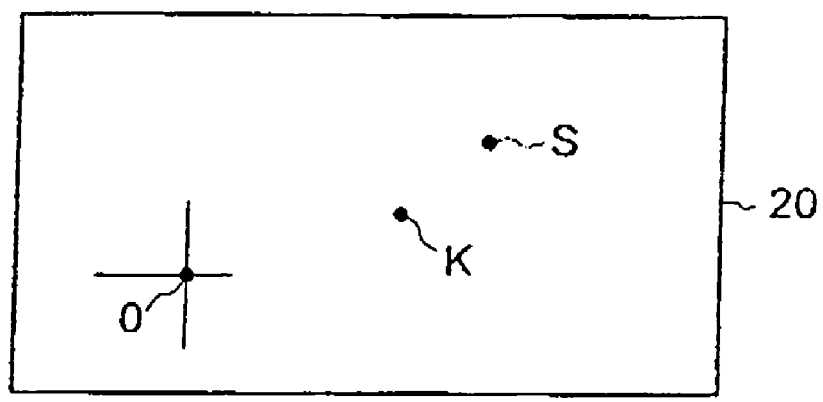
FIG. 3 is a view showing a display example of a display.
Figure 4:
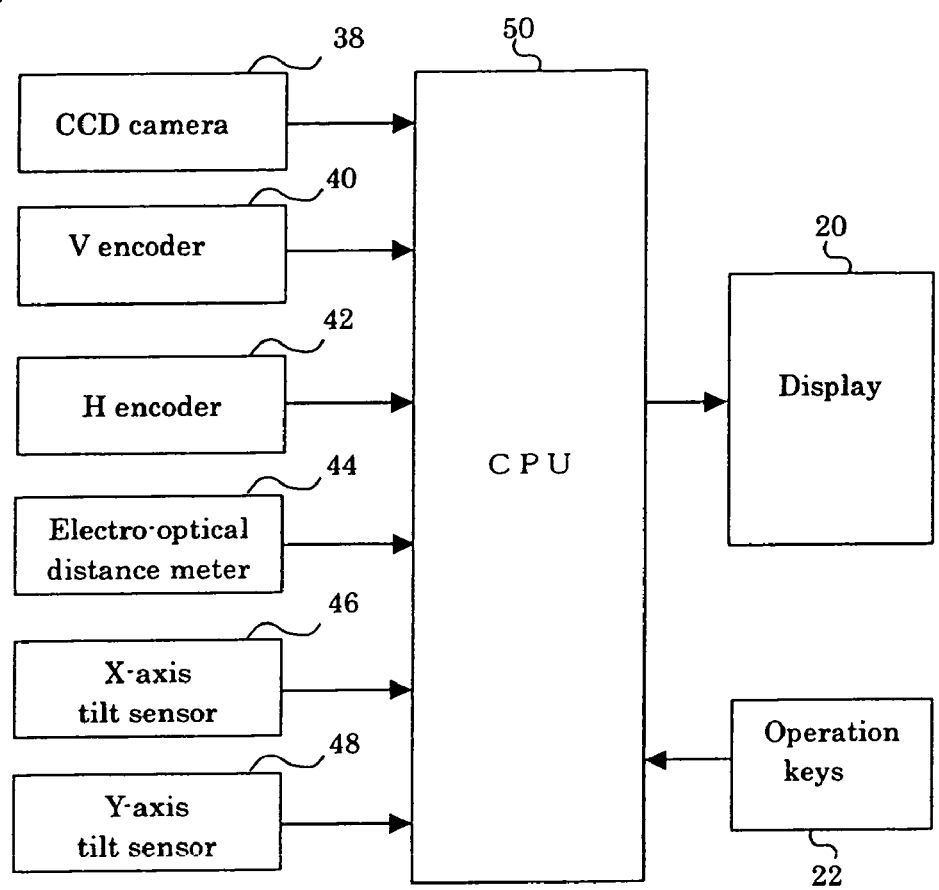
FIG. 4 is a block diagram of the surveying instrument.
Figure 5:
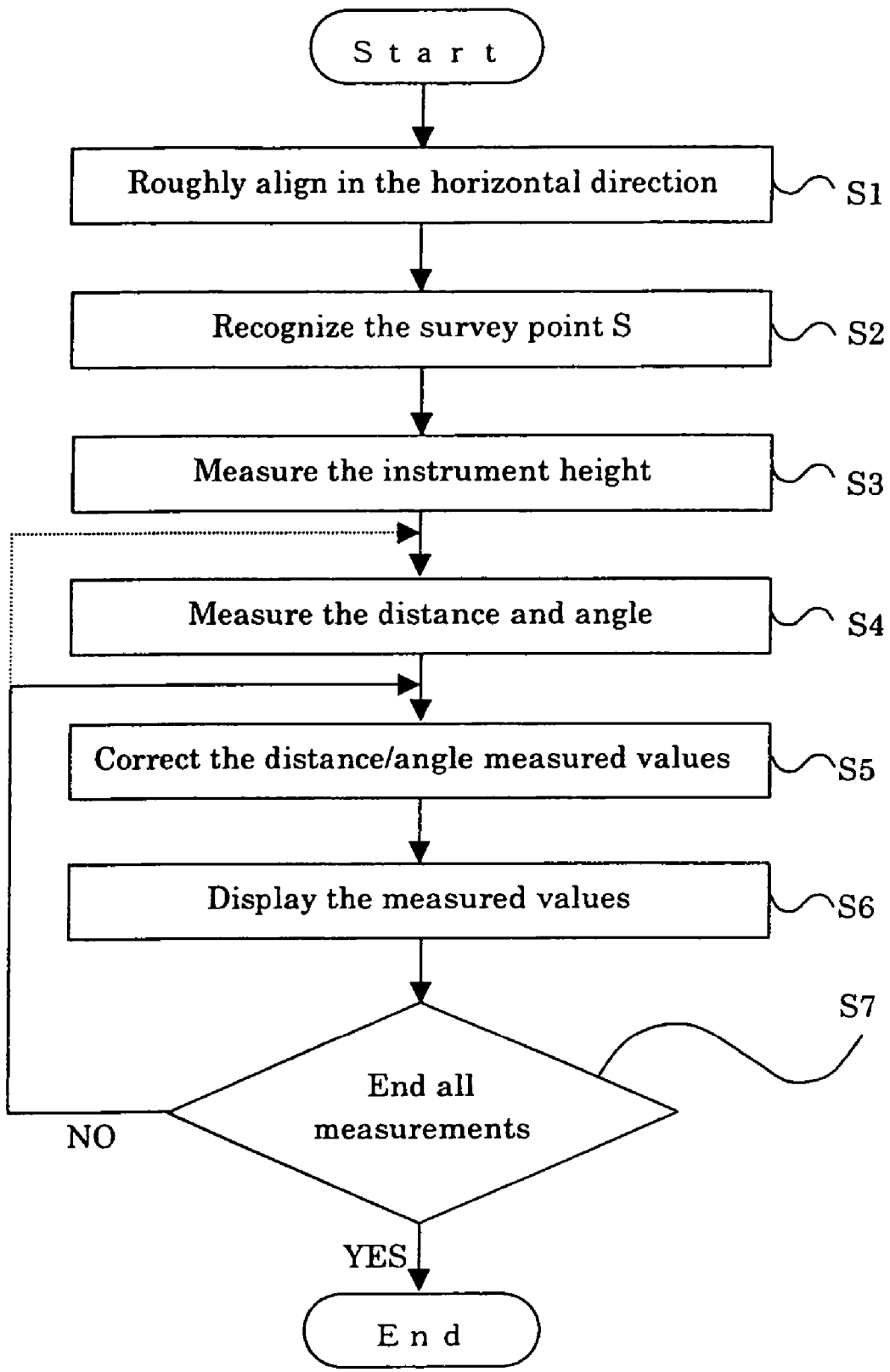
FIG. 5 is a flowchart for explaining the operation of the surveying instrument.
Figure 6:
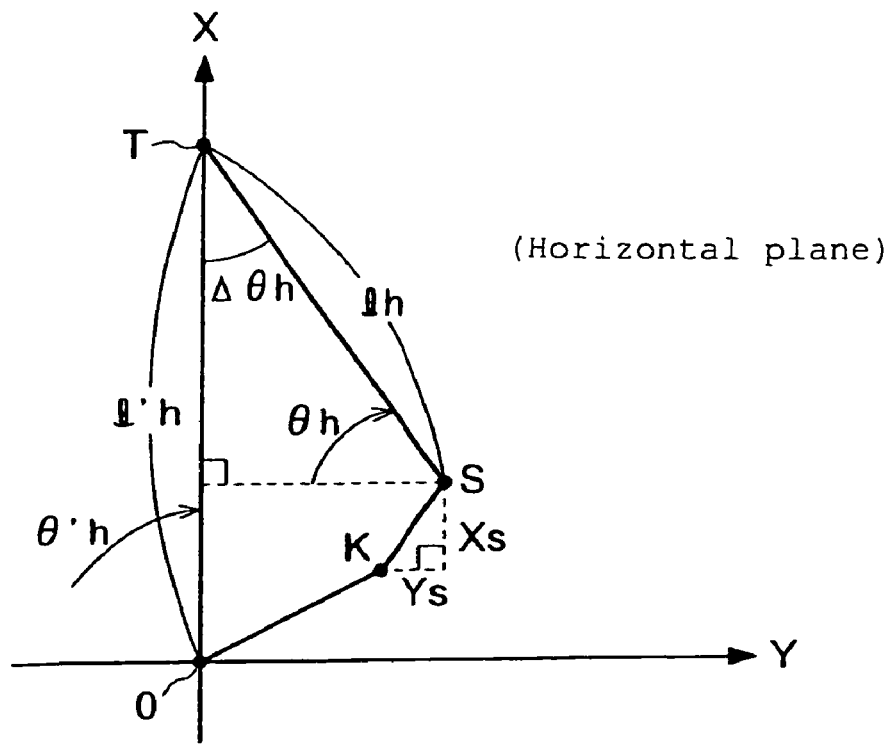
FIG. 6 is a view for explaining distance measurement and angle measurement in a horizontal plane.
Figure 7:
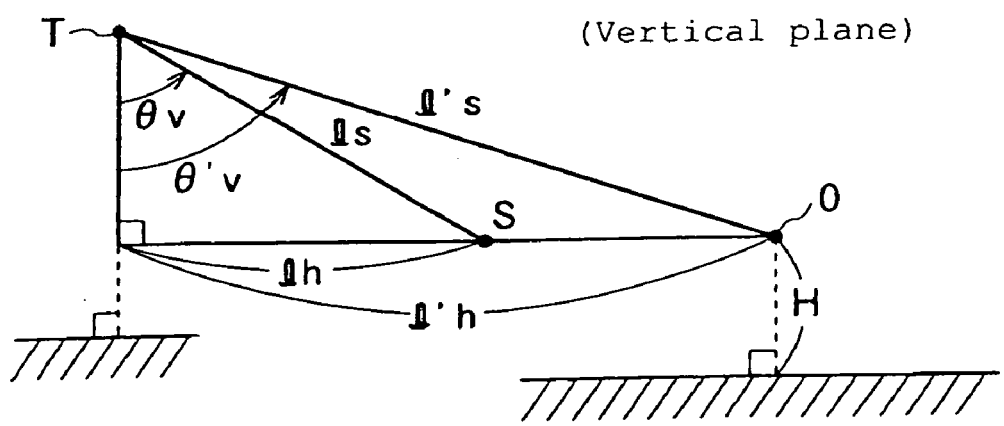
FIG. 7 is a view for explaining distance measurement and angle measurement in a vertical plane.
Figure 8:
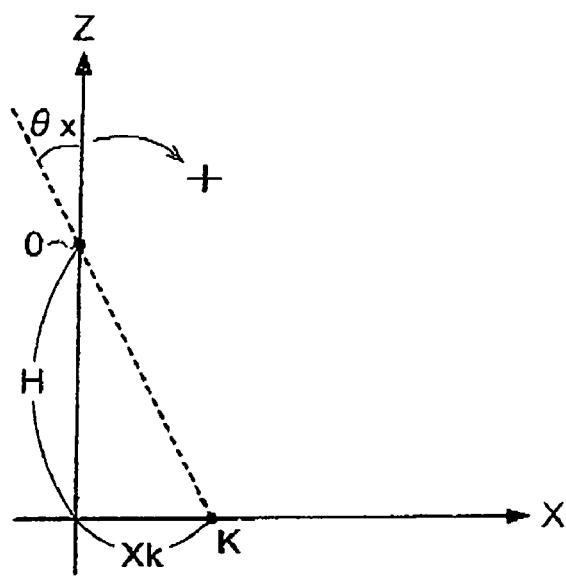
FIG. 8 is a view for explaining a detection method of an X-axis tilt sensor.
Figure 9:
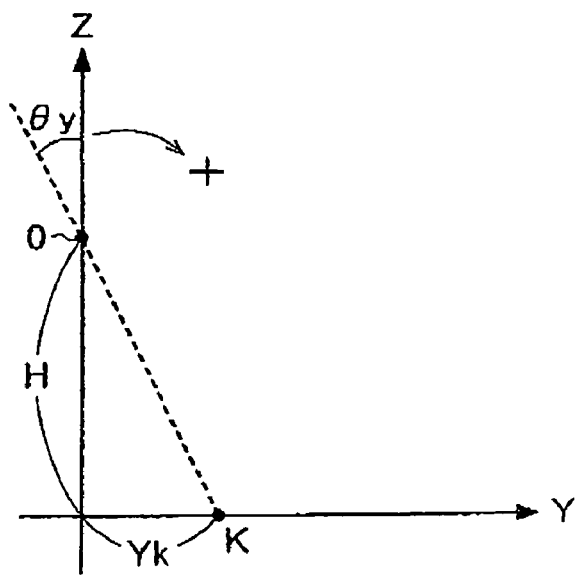
FIG. 9 is a view for explaining a detection method of a Y-axis tilt sensor.
Figure 10:
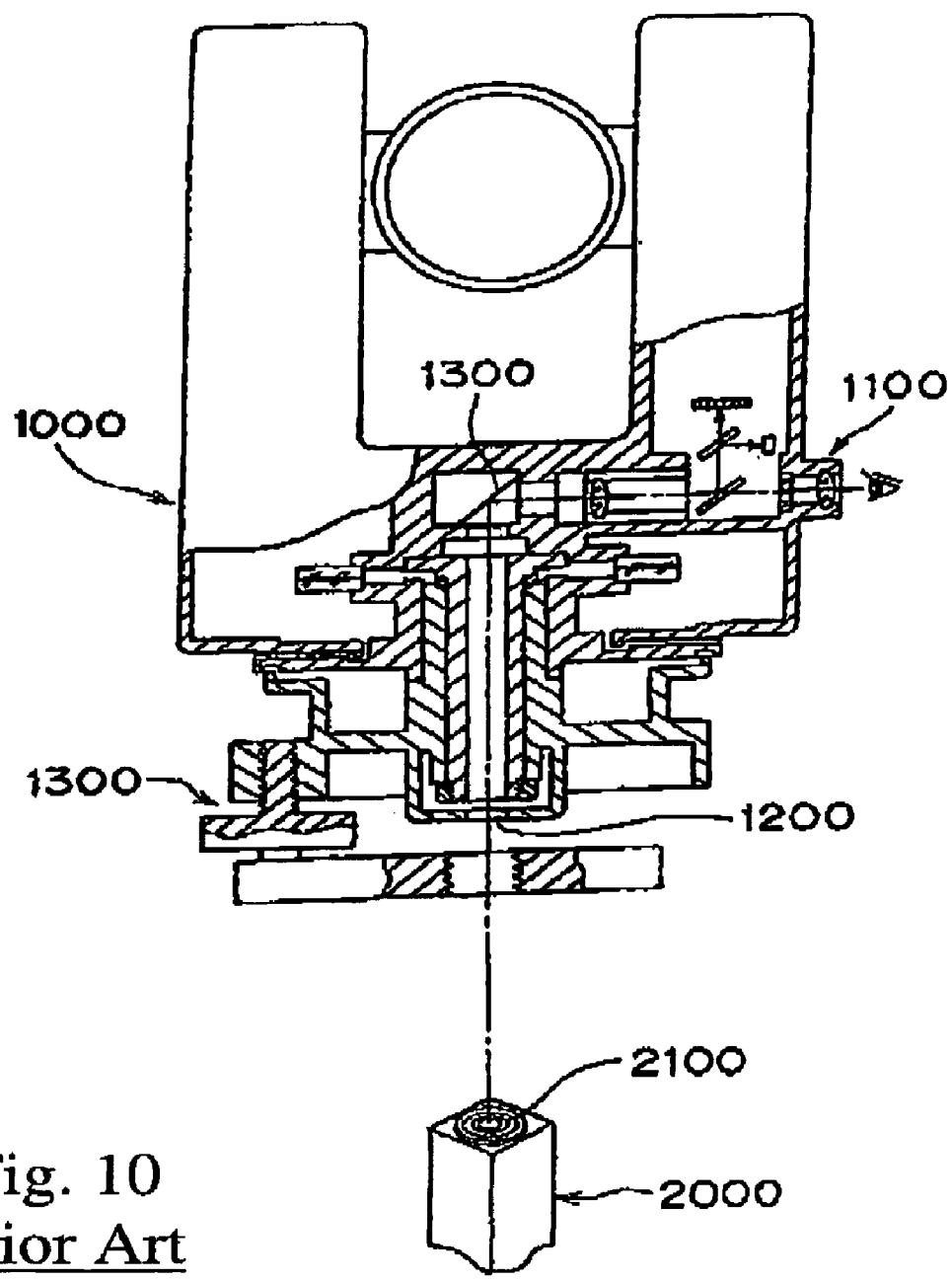
FIG. 10 is a longitudinal sectional view of the main part of a conventional surveying instrument.
Figure 11:
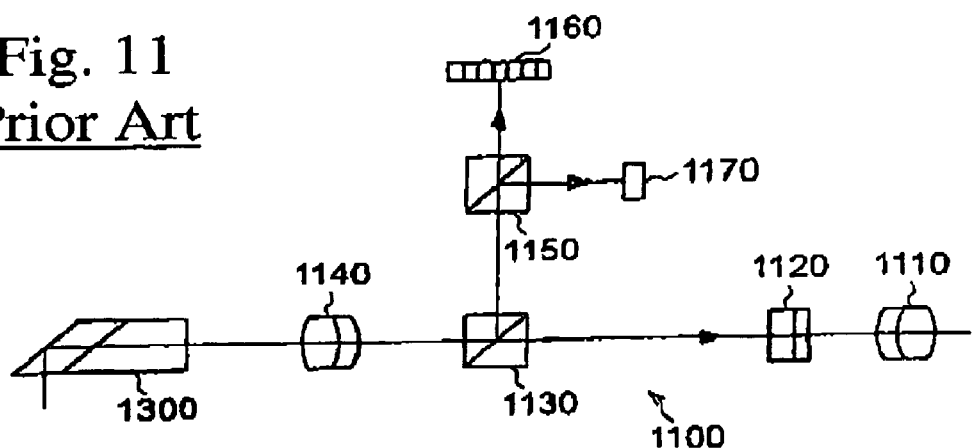
FIG. 11 is a schematic view of an optical system of the conventional surveying instrument.
Figure 12:
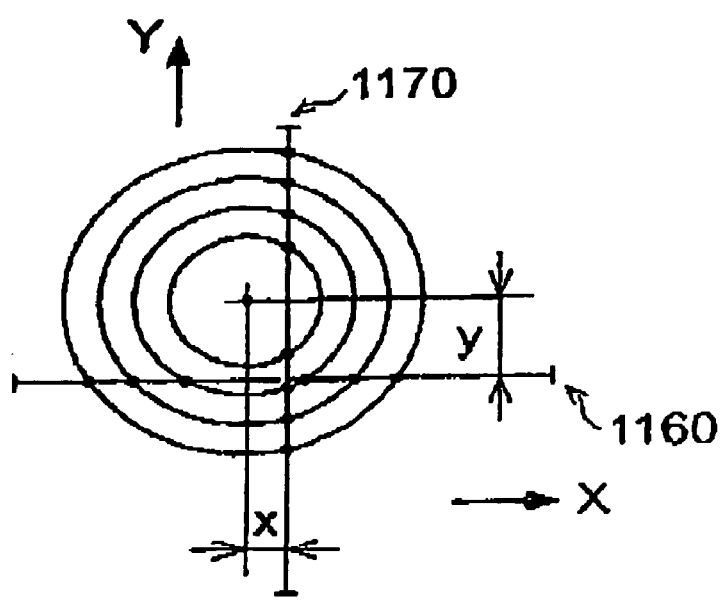
FIG. 12 is a view showing an image example of a target used in the conventional surveying instrument.

10 Surveying instrument
12 Body casing
16 Collimation telescope
20 Display
24 Leveling plate
28 Vertical shaft
38 CCD camera
40 V encoder
42 H encoder
44 Electro-optical distance meter
46 X-axis tilt sensor
48 Y-axis tilt sensor
50 CPU

The invention claimed is:

1. A surveying instrument comprising:
    measurement means for performing at least either distance measurement or angle measurement;
    image pickup means for picking up an area located under a vertical shaft of an instrument body, the area existing as a photographic subject;
    display means for displaying an image picked up by the image pickup means on a screen;
    an indicator for specifying a location of a survey point in an image displayed on the screen;
    decentering-amount calculation means for calculating an amount of decentering of a survey point with respect to an instrument center of the instrument body in response to receiving said specification by which the survey point displayed on the screen in the form of the image picked up by the image pickup means is fixed as a true centering point; and
    correction means for connecting a measured value of the measurement means based on the instrument center on the basis of a calculation result obtained by the decentering-amount calculation means.

2. A surveying instrument comprising:
    measurement means for performing at least either distance measurement or angle measurement;
    image pickup means for picking up an area located under a vertical shaft of an instrument body, the area existing as a photographic subject;
    display means for displaying an image picked up by the image pickup means on a screen;
    decentering-amount calculation means for calculating an amount of decentering of a survey point with respect to an instrument center of the instrument body in response to specification by which the survey point displayed on the screen in the form of the image picked up by the image pickup means is fixed as a true centering point;
    auxiliary decentering-amount calculation means for calculating an amount of decentering from the instrument center of an axial center of the vertical shaft, the decentering caused by a slant of the vertical shaft of the instrument body; and
    correction means for connecting a measured value of the measurement means based on the instrument center on the basis of a calculation result obtained by the decentering-amount calculation means and on the basis of a calculation result obtained by the auxiliary decentering-amount calculation means.

3. A measured-value correction apparatus of a surveying instrument comprising:
    image pickup means for picking up an area located under a vertical shaft of an instrument body, the area existing as a photographic subject;

display means for displaying an image picked up by the image pickup means on a screen;

an indicator for specifying a location of a survey point in an image displayed on the decentering-amount calculation means for calculating an amount of decentering of a survey point with respect to an instrument center of the instrument body in response to receiving said specification by which the survey point displayed on the screen in the form of the image picked up by the image pickup means is fixed as a true centering point; and correction means for connecting a measured value based on the instrument center on the basis of a calculation result obtained by the decentering-amount calculation means.

4. A measured-value correction apparatus of a surveying instrument comprising:

image pickup means for picking up an area located under a vertical shaft of an instrument body, the area existing as a photographic subject;

display means for displaying an image picked up by the image pickup means on a screen;

decentering-amount calculation means for calculating an amount of decentering of a survey point with respect to an instrument center of the instrument body in response to specification by which the survey point displayed on the screen in the form of the image picked up by the image pickup means is fixed as a true centering point;

auxiliary decentering-amount calculation means for calculating an amount of decentering from the instrument center of an axial center of the vertical shaft, the decentering caused by a slant of the vertical shaft of the instrument body; and correction means for connecting a measured value based on the instrument center on the basis of a calculation result obtained by the decentering-amount calculation means and on the basis of a calculation result obtained by the auxiliary decentering-amount calculation means.

* * * * *